(12) United States Patent
Klausberger et al.

(10) Patent No.: US 7,027,712 B2
(45) Date of Patent: Apr. 11, 2006

(54) METHOD AND APPARATUS FOR RECORDING ON A STORAGE MEDIUM OR REPLAYING FROM A STORAGE MEDIUM DATA PACKETS OF A TRANSPORT STREAM

(75) Inventors: Wolfgang Klausberger, Laatzen (DE); Ralf Ostermann, Hannover (DE); Michael Pieper, Hannover (DE); Friedrich Timmermann, Garbsen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 1118 days.

(21) Appl. No.: 09/826,972

(22) Filed: Apr. 5, 2001

(65) Prior Publication Data
US 2001/0028612 A1 Oct. 11, 2001

(30) Foreign Application Priority Data
Apr. 8, 2000 (EP) .................................. 00250120

(51) Int. Cl.
*H04N 5/76* (2006.01)
*H04N 5/781* (2006.01)

(52) U.S. Cl. .......................... 386/65; 386/111; 386/125

(58) Field of Classification Search ................ 370/389, 370/395.1, 470, 471, 476, 474; 386/33, 40, 386/65, 98, 111–112; 348/423.1; H04N 5/76, H04N 5/781, 7/12, 11/02, 11/04
See application file for complete search history.

(56) References Cited

U.S. PATENT DOCUMENTS 6,031,960 A * 2/2000 Lane ............................ 386/68

| | | | | |
|---|---|---|---|---|
| 6,680,944 B1 * | 1/2004 | Lym et al. | .................... | 370/394 |
| 6,687,752 B1 * | 2/2004 | Falco et al. | .................. | 709/230 |
| 6,693,913 B1 * | 2/2004 | Chiussi et al. | .............. | 370/412 |
| 2003/0050954 A1 * | 3/2003 | Tayyar et al. | ................ | 709/102 |
| 2004/0264485 A1 * | 12/2004 | Okamura | ..................... | 370/412 |

FOREIGN PATENT DOCUMENTS

| EP | 0 749 244 | 12/1996 |
|---|---|---|
| EP | 0 986 248 | 3/2000 |
| WO | WO 96 30905 | 10/1996 |
| WO | WO 98 40889 | 9/1998 |

* cited by examiner

*Primary Examiner*—Thai Tran
(74) *Attorney, Agent, or Firm*—Joseph J. Laks; Ronald H. Kurdyla; Guy H. Eriksen

(57) ABSTRACT

MPEG2 data streams contain data packets for a set of programs and time stamps for data synchronization purposes. An MPEG2 transport stream is assembled of fixed-length transport packets. The received transport packets of at least one specific program of this set of programs can be stored using for example a DVD Streamer recorder or DVD-RAM recorder. For the real-time playback of recorded specific program data packets each packet needs a separate time stamp. For that reason a timestamp is to be captured for each data packet at recording time. However, capturing of timestamps from a transport stream is a very time consuming action in software implementation processing. Therefore transport stream timestamps are captured for every Nth packet only and the missing timestamps are calculated. Thereby software-processing time is saved for generating the timestamps required for real-time bitstream recording.

20 Claims, 2 Drawing Sheets

METHOD AND APPARATUS FOR RECORDING ON A STORAGE MEDIUM OR REPLAYING FROM A STORAGE MEDIUM DATA PACKETS OF A TRANSPORT STREAM

FIELD OF THE INVENTION

The invention relates to a method and to an apparatus for recording on a storage medium, or replaying from a storage medium, data packets of a transport stream which data packets belong to at least one specific of several programs contained in said transport stream.

BACKGROUND OF THE INVENTION

MPEG2 data streams contain time stamps for data synchronisation purposes and for determining in a decoder the presentation time and/or the decoding time for video and/or audio data. An MPEG2 transport stream carries several programs and is assembled of corresponding fixed-length transport packets for these programs.

SUMMARY OF THE INVENTION

A specific MPEG2 program can be received by a DVB (digital video broadcasting) receiver, e.g. a settop box, or an ATSC (advanced television system committee) receiver, e.g. a digital TV receiver. The data packets of that specific program can be recorded on an optical medium using for example a DVD Streamer recorder or DVD-RAM recorder. For the real-time playback of recorded data packets—for instance MPEG2 transport packets according to the DVB-S standard—each packet needs separate time information, i.e. a packet time stamp. For that reason a timestamp is to be captured for each data packet at recording time. However, capturing of timestamps from a transport stream is a very time consuming action in software implementation processing. A problem to be solved by the invention is to provide in a processing time—in particular software-processing time—saving manner timestamps required for data packet recording or replaying.

Consecutive MPEG2 transport packets do have an equal length of 188 bytes each. Normally, equidistance can be assumed for such transport packets when originating from e.g. satellite or cable or terrestrial transmission. Advantageously it is therefore possible to capture transport stream timestamps for every Nth packet only and to merely calculate the missing timestamps. Thereby software-processing time is saved for generating the timestamps required for real-time bit-stream recording.

In principle, the inventive method is suited for recording on a storage medium, or replaying from a storage medium, data packets of a transport stream which data packets belong to at least one specific program, wherein said transport stream originally includes data packets for a set of programs and wherein timestamps are assigned to the data packets of said transport stream, and wherein:
  the timestamps for some of said recorded or replayed data packets of said specific program are original timestamps of corresponding data packets of said transport stream;
  the timestamps for the remaining recorded or replayed specific program data packets are calculated using said original timestamps of said some data packets of the specific program.

In principle the inventive apparatus is suitable for recording or replaying data packets of a transport stream which data packets belong to at least one specific program, wherein said transport stream originally includes data packets for a set of programs and wherein timestamps are assigned to the data packets of said transport stream, the apparatus including:
  means for selecting from said transport stream timestamps and data packets belonging to said specific program, wherein timestamps for some of these data packets to be recorded are original timestamps of corresponding data packets of said transport stream;
  means for calculating the timestamps for the remaining specific program data packets to be recorded, using said original timestamps of said some data packets of the specific program;
  means for assembling and recording said specific program data packets together with said original and calculated timestamps on a storage medium;
  means for replaying the recorded specific program data packets together with said original timestamps and said calculated timestamps;
  means for evaluating said original timestamps and said calculated timestamps;
  means for assembling—under control of said means for evaluating said original and calculated timestamps—the replayed specific program data packets together with said original and calculated timestamps, corresponding to their original temporal position in the original transport stream.

BRIEF DESCRIPTION OF THE DRAWINGS

Exemplary embodiments of the invention are described with reference to the accompanying drawings, which show in.

DETAILED DESCRIPTION OF PREFERRED EMBODIMENTS

Figure 1:
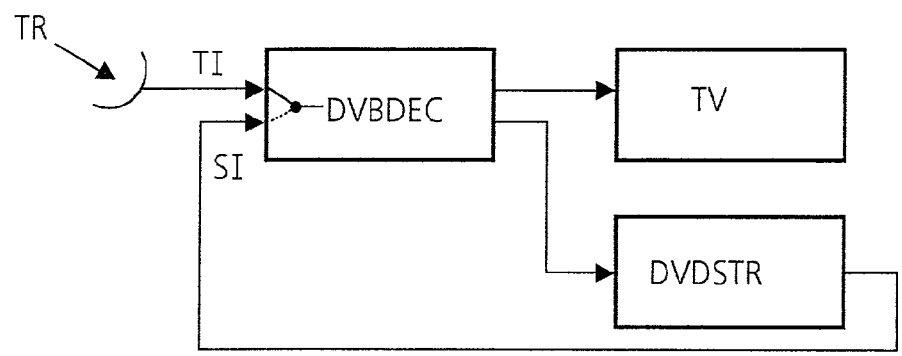
FIG. 1 simplified block diagram of consumer reception equipment including a data recorder.
Figure 3:
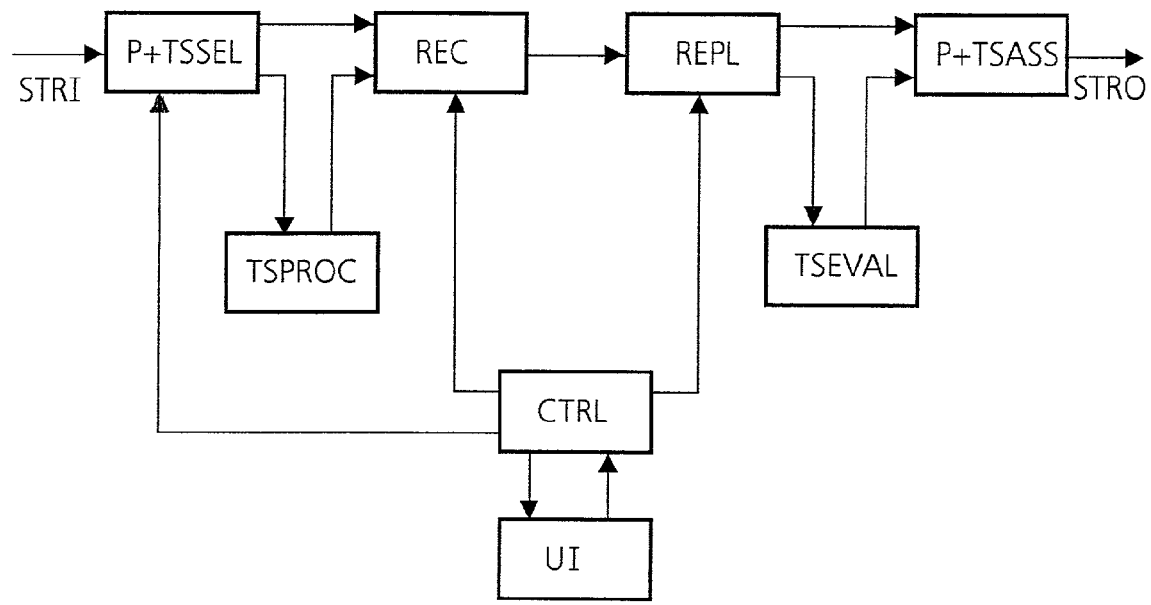
FIG. 3 block diagram of the signal processing part of a data stream recorder.

In FIG. 1 a transport stream from a transmitter TR is received at a transport stream input TI of a DVB decoder DVBDEC, e.g. a settop box. TR can be a satellite, an RF transmitter, a cable operator, a telecommunication network or any other source for a data stream with equidistant transport packets. One output of DVBDEC may be connected to a TV set or to a monitor. A further output of DVBDEC is connected to the recording input of a DVD Streamer DVDSTR or any other recorder for digital data. The replay output of DVDSTR is connected to a streamer input SI of DVBDEC. Preferably the data recorder DVDSTR does not decode the MPEG2 transport stream, but it is also possible to use a data recorder which includes MPEG2 decoding and re-encoding. In record mode, DVDSTR selects the packets for one or more programs out of the transport stream delivered by DVBDEC and assembles sector packs including for example 10 transport packets together with their packet headers, for subsequent storage. The quantity of programs that can be recorded depends on the maximum data rate of the storage device or on its maximum processing power.

For real-time playback with DVDSTR each transport packet must carry its own timestamp. A timestamp is a data word having a length of e.g. 4 bytes and representing a proceeding time information. For a software implementation processing it would be very time consumptive to capture the timestamp of each transmitted transport packet because the distance between the packets is approximately 40 µs only. This value results from (1/net_transponder bitrate)*188 byte*8 bit/byte wherein the net_transponder_bitrate is 38.9 Mbit/s.

Figure 2:
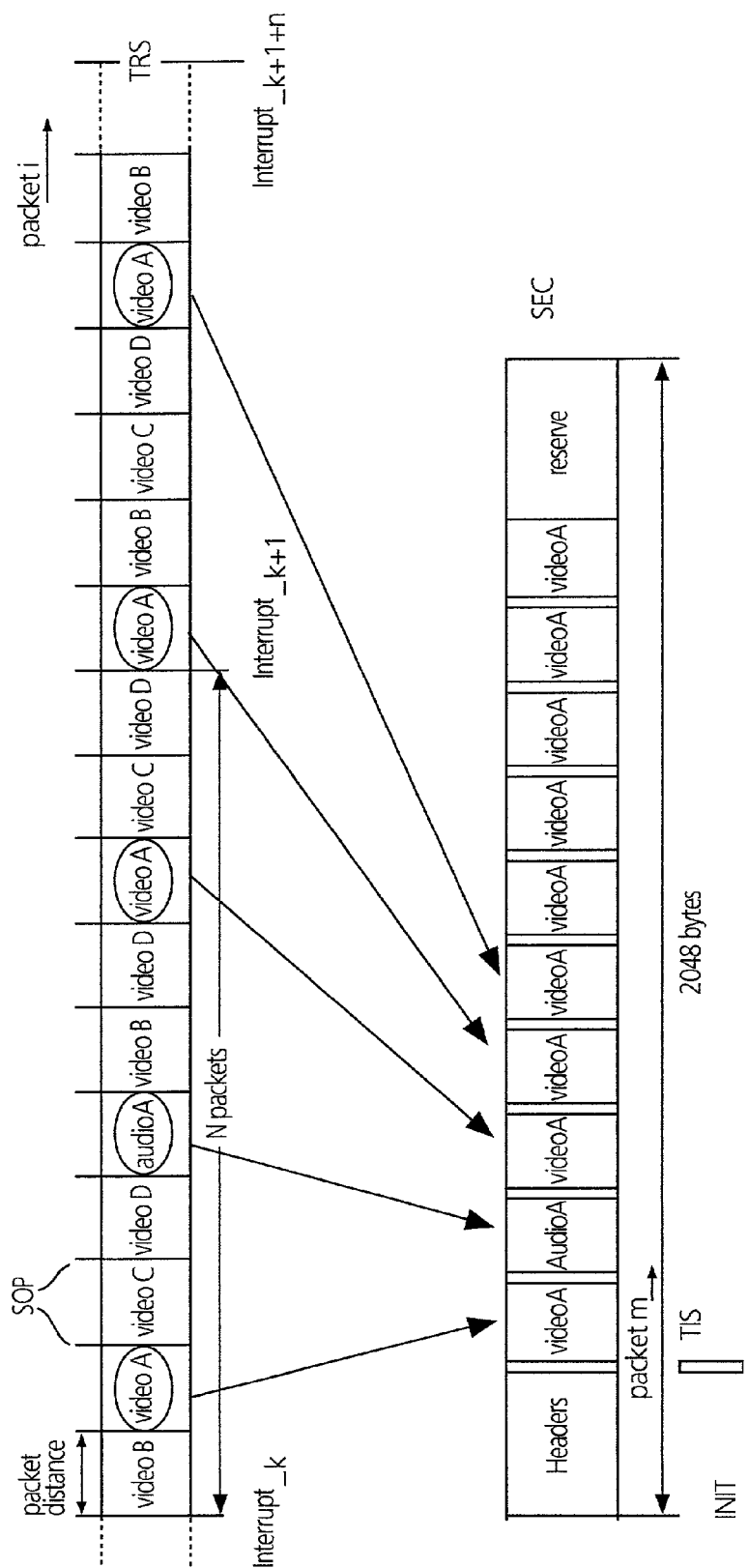
FIG. 2 example of a transport stream containing data packets of four programs, and assembled data packets of one of these programs.

The upper part of FIG. 2 shows a transport stream TRS containing packets with video and audio data for programs A to D. Program A has been selected for the recording in DVDSTR. The begin of each MPEG2 packet is marked by a pulse 'start_of_packet' SOP which can be used to generate an interrupt signal for capturing a timestamp. For instance every Nth SOP in the transport stream is set as 'valid'. A timestamp TIS follows every SOP.

Following selection of e.g. 10 program-A transport packets from the transport stream, a sector pack SEC as shown in the bottom part of FIG. 2 is prepared for storage. A sector pack has a length of e.g. 2048 bytes and includes sector headers For replaying a correct timestamp is required for each packet of a sector. Therefore a timestamp for each packet of a sector needs to be recorded. Corresponding sector packet timestamps TIS can be calculated from the transport stream timestamps occurring at time instants $t_{interrupt\_k}$ and $t_{interrupt\_k+1}$ in the following way:

sector_packet_timestamp $m$=(transport_packet_number $i$*transport_packet distance)+initial_time wherein
transport_packet_distance=$(t_{interrupt\_k+1}-t_{interrupt\_k})$/N;
initial_time=$t_{interrupt\_k}$;
N=quantity of transport packets between $t_{interrupt\_k}$ and $t_{interrupt\_k+1}$, N can be fixed or can be variable;
M=quantity of selected transport packets between $t_{interrupt\_k}$ and $t_{interrupt\_k+1}$;
sector packet No. m refers to the corresponding source packet No. i in the transport stream, i are values out of the range 0 ... N–1, m=0 ... M–1.

If N is variable a corresponding value information can be recorded, too.

As an alternative, it is also possible to store when recording only the $t_{interrupt\_x}$ timestamps and information about the number of intermediate packets of the other programs of the transport stream and the number of packets between the interrupts, and to calculate the missing sector packet time stamps when replaying.

In both embodiments the replayed sector packets are output from DVDSTR corresponding to the temporal position as depicted in the upper part of FIG. 2. The result is a transport stream in which the transport packets of the other programs are missing.

DVD Streamer DVDSTR may contain the following stages: The data stream recorder input signal STRI passes through a packet and timestamp selector P+TSSEL, a recording stage REC, a replay stage REPL and a packet and a timestamp assembling stage P+TSASS that provides the data stream recorder output signal STRO.

Stage P+TSSEL selects the packets carrying program A from the transport stream, and the transport stream timestamps occurring at time instants $t_{interrupt\_k}$ and $t_{interrupt\_k+1}$ The sector_packet_time-stamps are calculated in a timestamp processing stage TSPROC from $t_{interrupt\_k}$ and $t_{interrupt\_k+1}$ using above formulas, and are fed to stage REC for recording together with the corresponding sector packets. In a timestamp evaluation stage TSEVAL the sector_packet_ timestamps are evaluated from the replayed sector data, and are fed to stage P+TSASS for outputting a data stream with correct temporal position of the program A transport stream packets. P+TSSEL, REC and REPL are controlled by a controller CTRL that receives input from a user interface UI, e.g. the control keys on the front surface of the Streamer device.

In this description the base for capturing timestamps and for the numbers given is a 32-bit-counter with a clock frequency of 27 MHz. The numbers given can be adapted correspondingly to any other application of the invention.

The invention can be used for video and/or audio recording based on MPEG2, MPEG1, MPEG4, AC-3 or any other coding standard. For the recording optical or opto-magnetic media like DVD or magnetic media like hard disc or tape can be used.

What is claimed, is:

1. Method for recording on a storage medium data packets of an MPEG 2 transport stream which MPEG 2 transport stream data packets to be recorded belong to at least one specific program, wherein said MPEG 2 transport stream originally includes data packets for a set of programs, and wherein original timestamps are assigned to data packets of said transport stream, and wherein a time stamp is to be assigned to each recording data packet, said method comprising the steps:

selecting out of said MPEG2 transport stream MPEG2 transport packets for said at least one specific program and assembling, for subsequent storage, sector packs each including multiple transport packets of said at least one specific program together with their packet headers using software implementation processing, capturing original timestamps from said MPEG2 transport stream related to some of said transport packets in said sector packs to be recorded, and calculating using said captured original MPEG2 transport stream timestamps, timestamps for the other transport packets in said sector packs to be recorded such that to each of these other transport packets in a sector pack a calculated timestamp is assigned which replaces the corresponding original time stamp, and thereby the sequence of calculated timestamps is interspersed with original timestamps;

recording said sector packs together with said calculated and interspersed original timestamps.

2. Method according to claim 1, wherein the captured original timestamps have a fixed temporal distance of a predetermined number of original packets in said MPEG 2 transport stream.

3. Method according to claim 1, wherein said specific program data packets are recorded or replayed using a DVD Streamer device.

4. Method according to claim 1, wherein said storage medium is an optical disc or opto-magnetic disc or a hard disc.

5. Method according to claim 1, wherein the calculated timestamps for the transport packets in the sector packs are calculated from captured original MPEG2 transport stream timestamps occurring at time instants tinterrupt_k and tinterrupt_k+1 in the following way:

sector_packet_timestamp m=(transport_packet_number i*transport_packet_distance)+initial_time, wherein
transport_packet_distance=(tinterupt_k+1–tinterrupt_k)/N;

initial_time=tinterrupt_k;

N=quantity of transport packets between tinterrupt_k and tinterrupt_k+1, N fixed or variable;

M=quantity of selected transport packets between tinterrupt_k and tinterrupt_k+1;

sector packet number m refers to the corresponding source packet number i in the MPEG2 transport stream;

'i' are values out of the range 0 . . . N−1, and m=0 . . . M−1;

if N is variable, a corresponding value information is recorded or replayed, too.

6. Apparatus for recording on a storage medium data packets of an MPEG 2 transport stream which MPEG 2 transport stream data packets to be recorded belong to at least one specific program, wherein said MPEG 2 transport stream originally includes data packets for a set of programs, and wherein timestamps are assigned to the data packets of said transport stream, and wherein a time stamp is to be assigned to each recording data packet, said apparatus including:

means being adapted for selecting out of said MPEG2 transport stream MPEG2 transport packets for said at least one specific program and for assembling, for subsequent storage, sector packs each including multiple transport packets of said at least one specific program together with their packet headers;

means being adapted using software implementation processing for capturing original timestamps from said MPEG2 transport stream related to some of said transport packets in said sector packs to be re-corded, and for calculating using said captured original MPEG2 transport stream timestamps, timestamps for the other transport packets in said sector packs to be recorded such that to each these other transport packets in a sector pack a timestamp is assigned which replaces the corresponding original time stamp, and thereby the sequence of calculated timestamps is interspersed with original timestamps;

means being adapted for recording said sector packs together with said calculated and interspersed original timestamps.

7. Apparatus according to claim 6, wherein the captured original have a fixed temporal distance of a predetermined number of original packets in said MPEG 2 transport stream.

8. Apparatus according to claim 6, wherein said specific program data packets are recorded or replayed using a DVD Streamer device.

9. Apparatus according to claim 6, wherein said storage medium is an optical disc or opto-magnetic disc or a hard disc.

10. Apparatus according to claim 6, wherein the calculated timestamps for the transport packets in the sector packs are calculated from captured original MPEG2 transport stream timestamps occurring at time instants tinterrupt_k and tinterrupt_k+1 in the following way:

sector_packet_timestamp m=(transport_packet_number i*transport_packet_distance)+initial_time wherein transport_packet_distance=(tinterrupt_k+1−tinterrupt_k)/N;

initial_time=tinterrupt_k;

N=quantity of transport packets between tinterrupt_k and tinterrupt_k+1, N fixed or variable;

M=quantity of selected transport packets between tinterrupt_k and tinterrupt_k+1;

sector packet number m refers to the corresponding source packet number i in the MPEG2 transport stream;

'i' are values out of the range 0 . . . N−1, and m=0 . . . M−1;

if N is variable, a corresponding value information is recorded or replayed, too.

11. Method for replaying from a storage medium recorded data packets of an MPEG2 transport stream which recorded MPEG2 transport stream data packets belong to at least one specific program, wherein said MPEG2 transport stream originally had included data packets for a set of programs and original timestamps were assigned to data packets of said transport stream, and wherein time stamps calculated from said original timestamps were assigned to some of the recording data packets that were recorded in sector packs, said method comprising the steps:

replaying recorded sector packs;

evaluating said calculated timestamps and the interspersed original timestamps that were assigned to each transport packet in a sector pack;

outputting, by using said calculated and original timestamps, the MPEG2 transport stream packets for said at least one specific program in a temporal position that corresponds to the temporal position said MPEG2 transport stream packets for said at least one specific program had in said original MPEG2 transport stream including data packets for a set of programs.

12. Method according to claim 11, wherein the calculated timestamps for the transport packets in the sector packs are calculated from captured original MPEG2 transport stream timestamps occurring at time instants tinterrupt_k and tinterrupt_k+1 in the following way:

sector_packet_timestamp m=(transport_packet_number i*transport_packet_distance)+initial_time, wherein transport_packet_distance=(tinterrupt_k+1 tinterrupt_k)/N;

initial_time=tinterrupt_k;

N=quantity of transport packets between tinterrupt_k and tinterrupt_k+1, N fixed or variable;

M=quantity of selected transport packets between tinterrupt_k and tinterrupt_k+1;

sector packet number m refers to the corresponding source packet number i in the MPEG2 transport stream;

'i' are values out of the range 0 . . . N−1, and m=0 . . . M−1;

if N is variable, a corresponding value information is recorded or replayed, too.

13. Method according to claim 11, wherein the captured original timestamps have a fixed temporal distance of a predetermined number of original packets in said MPEG2 transport stream.

14. Method according to claim 11, wherein said specific program data packets are recorded or replayed using a DVD Streamer device.

15. Method according to claim 11, wherein said storage medium is an optical disc or an opto-magnetic disc or a hard disc.

16. Apparatus for replaying from a storage medium recorded data packets of an MPEG2 transport stream which recorded MPEG2 transport stream data packets belong to at least one specific program, wherein said MPEG2 transport stream originally had included data packets for a set of programs and original timestamps were assigned to data packets of said transport stream, and wherein time stamps calculated from said original timestamps were assigned to some of the recording data packets that were recorded in sector packs, said apparatus including:

means being adapted for replaying recorded sector packs;

means being adapted for evaluating said calculated timestamps and the interspersed original timestamps that were assigned to each transport packet in a sector pack;

means being adapted for outputting, by using said calculated and original timestamps, the MPEG2 transport stream packets for said at least one specific program in a temporal position that corresponds to the temporal position said MPEG2 transport stream packets for said at least one specific program had in said original MPEG2 transport stream including data packets for a set of programs.

17. Apparatus according to claim 16, wherein the calculated timestamps for the transport packets in the sector packs are calculated from captured original MPEG2 transport stream timestamps occurring at time instants tinterrupt_k and tinterrupt_k+1 in the following way:

sector_packet_timestamp m=(transport_packet_number i*transport_packet_distance)+initial_time wherein transport_packet_distance=(tinterrupt_k+1 tinterrupt_k)/N;

initial_time=tinterrupt_k;

N=quantity of transport packets between tinterrupt_k and tinterrupt_k+1, N fixed or variable;

M=quantity of selected transport packets between tinterrupt_k and tinterrupt_k+1;

sector packet number m refers to the corresponding source packet number i in the MPEG2 transport stream;

'i' are values out of the range 0 . . . N−1, and m=0 . . . M−1;

if N is variable, a corresponding value information is recorded or replayed, too.

18. Apparatus according to claim 16, wherein the captured original timestamps have a fixed temporal distance of a predetermined number of original packets in said MPEG2 transport stream.

19. Apparatus according to claim 16, wherein said specific program data packets are recorded or replayed using a DVD Streamer device.

20. Apparatus according to claim 16, wherein said storage medium is an optical disc or an opto-magnetic disc or a hard disc.

* * * * *